United States Patent [19]

Sorimachi

[11] Patent Number: 5,331,442
[45] Date of Patent: Jul. 19, 1994

[54] IDENTIFICATION OF GRAPHIC AND CHARACTER AREAS IN COLOR IMAGE PROCESSOR

[75] Inventor: Yoshiyuki Sorimachi, Kanagawa, Japan

[73] Assignee: Fuji Xerox Co., Ltd., Tokyo, Japan

[21] Appl. No.: 665,106

[22] Filed: Mar. 6, 1991

[30] Foreign Application Priority Data

Mar. 7, 1990 [JP] Japan .................. 2-55768

[51] Int. Cl.⁵ ............................ H04N 1/46
[52] U.S. Cl. ........................ 358/532; 382/18; 358/462
[58] Field of Search .......... 358/464, 462, 467, 75, 358/80, 530–532, 447; 382/18, 19, 36–38; H04N 1/46

[56] References Cited

U.S. PATENT DOCUMENTS

| | | | |
|---|---|---|---|
| 4,811,239 | 3/1989 | Tsao | 358/75 |
| 4,888,646 | 12/1989 | Umeda et al. | 358/464 |
| 5,020,121 | 5/1991 | Rosenberg | 358/261.3 |
| 5,073,953 | 12/1991 | Westdijk | 358/462 |
| 5,101,438 | 3/1992 | Kanda et al. | 358/462 |
| 5,121,224 | 6/1992 | Ng et al. | 358/462 |
| 5,148,495 | 9/1992 | Imao et al. | 358/462 |

FOREIGN PATENT DOCUMENTS 63-193770 8/1988 Japan .
63-205783 8/1988 Japan .
1-95673 4/1989 Japan .

*Primary Examiner*—Reinhard J. Eisenzopf
*Assistant Examiner*—Jill Jackson
*Attorney, Agent, or Firm*—Finnegan, Henderson Farabow, Garrett & Dunner

[57] ABSTRACT

A block judgment section judges whether a subject block including a plurality of subject pixels is a white block, a black character block or a graphic/color block, on the basis of the frequency of white subject pixels and the density distribution of grey subject pixels. A macro-correction section corrects a judgment value of a character block to that of a graphic block, or vice versa on the basis of a first judgment whether there exists a graphic area larger than a predetermined size in the blocks surrounding the subject block, and a second judgment on the ratio between character blocks and graphic blocks in the blocks directly adjoining the subject block. The macro-corrected judgment value of the subject block is used to select image data of a development color or colors required for reproducing the subject block.

3 Claims, 14 Drawing Sheets

■ BLACK CHARACTER BLOCK
▨ GRAPHIC BLOCK
☐ ANY TYPE OF BLOCK

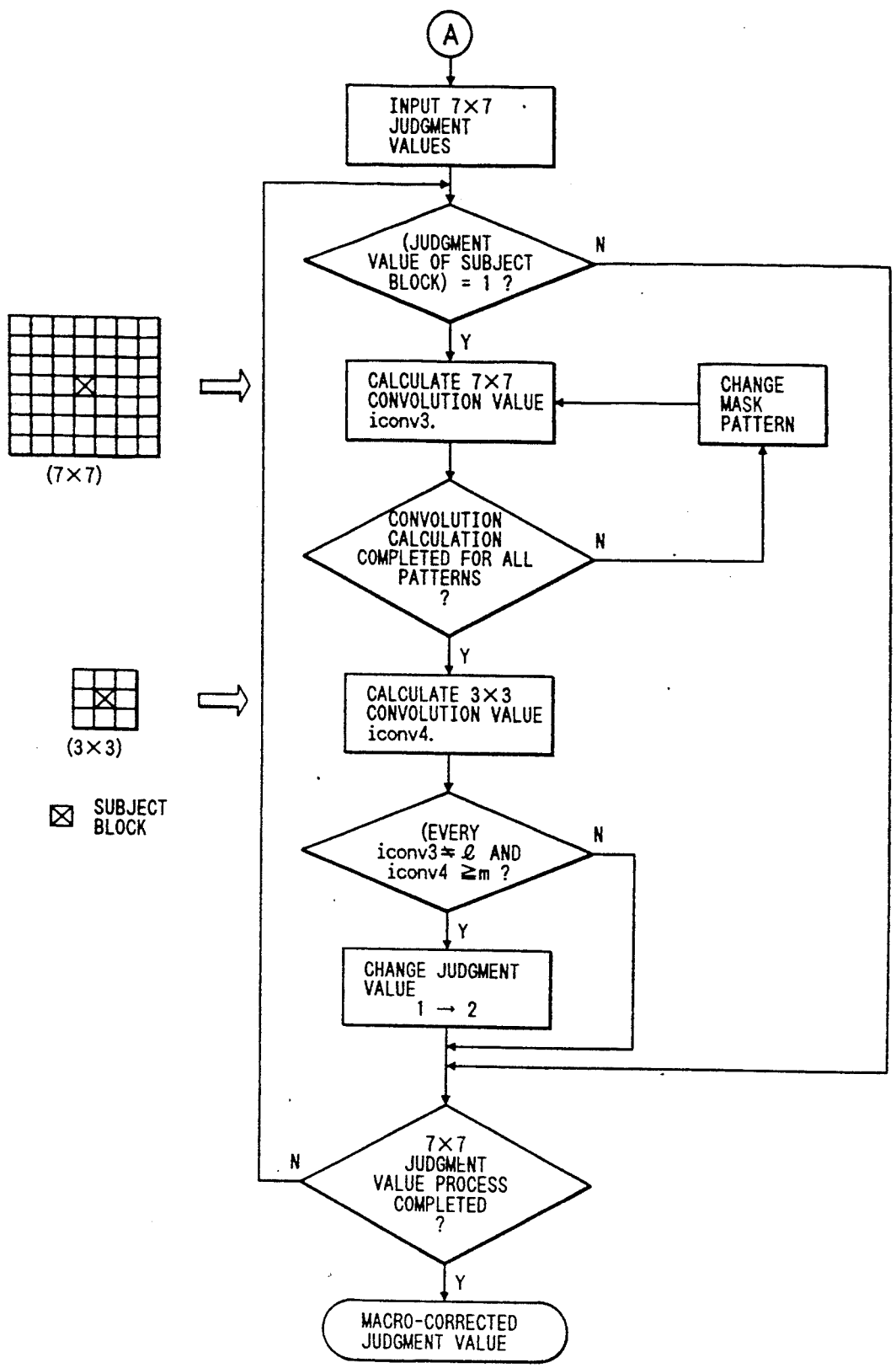

| JUDGMENT HUE \ JUDGMENT FLAG | r | m | c' | m' | y' |
|---|---|---|---|---|---|
| W | 0 | 0 | 0 | 0 | 0 |
| Y | * | 0 | 0 | 0 | 1 |
| M | * | 0 | 0 | 1 | 0 |
| C | * | 0 | 1 | 0 | 0 |
| B | * | 0 | 1 | 1 | 0 |
| G | * | 0 | 1 | 0 | 1 |
| R | * | 0 | 0 | 1 | 1 |
| K | 0 | 1 | * | * | * |

| DEVELOPMENT COLOR \ OUTPUT HUE | W | Y | M | C | B | G | R | K |
|---|---|---|---|---|---|---|---|---|
| y | 0 | 1 | 0 | 0 | 0 | 1 | 1 | 0 |
| m | 0 | 0 | 1 | 0 | 1 | 0 | 1 | 0 |
| c | 0 | 0 | 0 | 1 | 1 | 1 | 0 | 0 |
| k | 0 | 0 | 0 | 0 | 0 | 0 | 0 | 1 |

IDENTIFICATION OF GRAPHIC AND CHARACTER AREAS IN COLOR IMAGE PROCESSOR

BACKGROUND OF THE INVENTION

The present invention relates to an image processor which reproduces a composite document consisting of both binary images such as characters and half-tone images such as graphic images by identifying a character area and a graphic area during pre-scanning and switching parameters every area during main scanning.

FIG. 12 shows the configuration of a digital color image processor; FIG. 13 shows an exemplary configuration of a conventional edge processing circuit; and FIGS. 14(a) to 14(c) show the configuration of a hue detection circuit.

In a digital color copying machine, a document is usually read optically with a line sensor to obtain image data in the form of color separation signals of B (blue), G (green) and R (red), and, as shown in FIG. 12, the obtained image data are converted to toner color signals Y (yellow), M (magenta) and C (cyan) through an END (equivalent neutral density) conversion circuit 31 and a color masking (color correction) circuit 32. Further, a toner signal X of a development color is selected after replacing, for black print generation, the Y, M, C signals of the same quantity with a signal K (black) by an UCR (under color removal) circuit 33. Then, the selected toner signal X is subjected to a smoothing process and an edge enhancement process at a hue separation type nonlinear filter section, and to a tone adjustment process at a TRC (tone reproduction control) circuit 40. The signal X thus processed is converted to binary data at a screen generator (SG) 41, and this binary data is used to control a laser beam so that a charged photoreceptor is exposed on and off. A full-color document is reproduced by superposing dot images of the respective colors.

In the color image reproduction, such a digital color image processor necessarily requires a large-capacity memory if it is constructed so as to store full-color data for 4 development processes obtained by one document-reading scanning. To avoid this problem, the document-reading operation by the main scanning is performed every development color, and the resultant image data is subjected to the signal processing and then to the development process. Prior to the main scanning, pre-scanning is performed to detect the size of a document and judge whether the document is a color document or a monochrome one. Based on the information obtained by the prescanning, such operations as the copy operation control and parameter switching are performed so that a full-color output process is applied to color documents and a black (K) output process is applied to monochrome documents. To binary image documents consisting of characters and line drawings, edge enhancement is applied to improve the sharpness of images, while to half-tone documents such as photographs and dot prints, a nonlinear filtering process is applied to smooth images to improve the smoothness and granularity.

Then, the phase separation type nonlinear filter section for improving the reproduction performance of binary images and half-tone images will be described. The UCR circuit 33 selects, in accordance with the development process, development color image data X from among Y, M, C and K signals which have already been subjected to the black print generation and under color removal. The hue separation type nonlinear filter section receives the image data X and bifurcates it. A smoothing filter 34 performs a smoothing process on one image signal, while a gamma conversion circuit 36, an edge detection filter 37 and an edge enhancement LUT (look-up table) 38 perform an edge enhancement process on the other image signal. As a final stage, an adder 39 synthesizes the two outputs to produce a nonlinear filter signal. FIG. 13 shows an exemplary configuration of such an edge processing circuit.

In the edge processing, a hue detection circuit 35 detects the hue of an input image, and judges whether or not the current development color is a required color for the image. If the input image is black, the control is performed so that the Y, M and C color signals are subjected to no enhancement but only the K signal is enhanced commensurate with an edge enhancement degree.

As shown in FIG. 14(a), the hue detection circuit 35 includes: a maximum/minimum circuit 42 for calculating a maximum and a minimum of the Y, M and C signals; a multiplexer 43 for selecting a development color; a subtracting circuit 44 for calculating the difference between the maximum and the minimum; a subtracting circuit 45 for calculating the difference between the minimum and the development color; and comparators 46 to 48. Each of the comparators 46 to 48 compares its input value with a threshold and, if the input value is greater than the threshold, sets its output, such as r, m, c', m' and y', to a logic value "1". These outputs are used to obtain a Judgment hue based on the judgment conditions shown in FIG. 14 (b), and it is further judged whether the development color is a required color "1" or a non-required color "0" based on the required color/non-required color judgment conditions shown in FIG. 14(c). Ordinarily used character colors, Y, M, C, B, G, R and K are employed as the judgment hues.

As is apparent from the required color/non-required color judgment conditions, if the hue is, e.g., B, the development colors m and c are selected as the required colors while the other development colors as non-required colors. The development color image signal is subjected to the edge enhancement by using an edge enhancement LUT 38-(1) during the required color cycle while it is not subjected to the edge enhancement by using an edge enhancement LUT 38-(2) during the non-required color cycle.

However, in the above edge processing circuit, the edge enhancement LUT is controlled by specifying binary image areas for the edge enhancement in advance and generating an area signal in accordance with such specification. When processing binary images such as characters and line drawings and half-tone images such as photographs and dot prints, optimal parameters can be selected by specifying the type of image on a document or an area basis, as long as it is easy to specify a document or area in advance, and this hence contributes to improving the reproduction performance of the image. However, this step of area specification complicates the reproduction process if it is not easily conducted. Thus, if the area specification is cumbersome for a composite document consisting of both binary images and half-tone images, parameters which allow both types of images to be reproduced with moderate performance may be selected. In other words, however, neither types of images are processed optimally, thereby making it difficult to have both types of images reproduced satisfactorily. For example, a binary image becomes blur or unclear due to weak edge enhancement, and turbidity occurs in small black characters and at the edge of black characters. On the other hand, because of the enhancement of frequency components near the edge detection frequency, a half-tone image loses smoothness, becomes a coarse image having undesired moires and edge enhancement.

Thus, to identify the image type, there have been proposed a method in which a means for extracting a black component is provided and character area judgment is performed on the extracted black data (e.g., Japanese Patent Application Unexamined Publication No. Hei. 1-95673); a method using an average, standard deviation, etc. of pixels within a predetermined pixel block (e.g., Japanese Patent Application Unexamined Publication No. Sho. 63-205783); a method using binary outputs obtained by a plurality of dither conversions with different phases (e.g., Japanese Patent Application Unexamined Publication No. Sho. 63-193770); and other methods. However, these methods are neither capable of distinguishing color characters from black characters, nor capable of distinguishing characters from half-tone images, thus not contributing to improving judgment accuracy for a wide area.

Further, the above edge processing circuit has another problem that a smoothed signal remains in the signals Y, M and C even when processing a black character. This problem occurs in the following manner. As shown in FIG. 13, the edge enhancement LUT 38 just works such that the required color signal is enhanced by using the table (1) and the non-required color signal is not enhanced by using the table (2). As a result, in the case of a filter input signal of a black character, the edge enhanced signals are generated such that the signal K is enhanced, but not the signals Y, M and C, while the smoothed signals are generated in the smoothing filter 34 such that all the signals Y, M, C and K are smoothed. When the edge enhanced signal and smoothed signal are synthesized, the smoothed signals Y, M, C, K remain. Thus, despite the black character, not only the signal K but also the signals Y, M and C are carried, and this causes a color derived from the smoothed signals Y, M, C to appear at the edge portions of the character, disturbing reproduction by black (K). Comparing this example with a reproduction using only one color of black (K), there occur thickened lines, and edge discoloration and turbidity due to staggered registration, which results in impaired image quality with reduced sharpness.

SUMMARY OF THE INVENTION

The present invention has been made in view of the above circumstances. Accordingly, an object of the invention is to provide an image processor capable of identifying a character area and a half-tone area in a composite document with high accuracy, and further capable of identifying a black character and a color character in the character area.

Another object of the invention is to provide an image processor capable of identifying a character area and a half-tone area on a block-by-block basis, one block consisting of a plurality of pixels.

A further object of the invention is to provide an image processor capable of improving area identification accuracy on a block-by-block basis.

To achieve the above objects, the present invention is applied to a color image processor in which, as shown in FIG. 1, a data processing section 1 processes image data while selecting parameters suitable for each area in accordance with an identification signal (which is produced from image data of 3 primary colors) for identifying a graphic area and a character area data consisting of three primary colors, and an output section 2 outputs an image whose graphic and character reproduction performance is improved. According to the invention, the color image processor includes: a block judgment section 3 which judges whether a subject block consisting of a plurality of pixels is a white block, a character block or a graphic block on the basis of the frequency of white pixels and the density distribution of the pixels within the subject block; and a macro-correction section 4 which performs a macro-correction of a judgment value of the subject block by window pattern matching with ternary judgment values of blocks surrounding the subject block; wherein the image processor divides an image into a plurality of blocks, and identifies a character area and a graphic area. In addition to the block judgment, the macro-correction is performed using block judgment results, so that the block judgment can be supplemented to improve identification accuracy.

The block judgment section 3 may identify a black character area by judging whether the subject block is a white block, a black character block or a graphic/color block on the basis of the frequency of white pixels and the density distribution of grey pixels within the block. Further, the block judgment section 3 may identify a black character area, a color character area and a graphic area by judging whether the subject block is a white block, a black character block, a color character block or a graphic block on the basis of the frequency of white pixels, the frequency of grey pixels, and the density distribution of pixels within the subject block. The block judgment means 3 may perform the block judgment after averaging the image data in a sub-block. Further, a judgment whether each pixel is a black/white pixel or a color pixel may be performed on the basis of the difference between the maximum and minimum of the image data Y, M and C, and then a judgment whether the subject block is a black character block or not may be performed on the basis of the density distribution of grey pixels within the subject block.

The macro-correction section 4 may perform a judgment value correction from a character area to a graphic area or vice versa on the basis of a first judgment whether there exists a graphic area larger than a predetermined size in the blocks surrounding the subject block, and a second judgment on the ratio between character blocks and graphic blocks in the blocks directly adjoining the subject block.

BRIEF DESCRIPTION OF THE DRAWINGS

FIGS. 3(*a*) to 3(*f*) are charts for a description of mask patterns to be used for macro-correction;

FIGS. 8(a) and 8(b) are flow charts for a description of an algorithm for performing ternary pattern matching in the macro-correction;

FIG. 9 includes charts (a) to (i) for a description of a logical operation performed in the macro-correction;

DESCRIPTION OF THE PREFERRED EMBODIMENTS

Embodiments of the present invention will hereunder be described with reference to the accompanying drawings.

Figures 1, 3A, 3B, 3C, 3D, 3E, 3F:
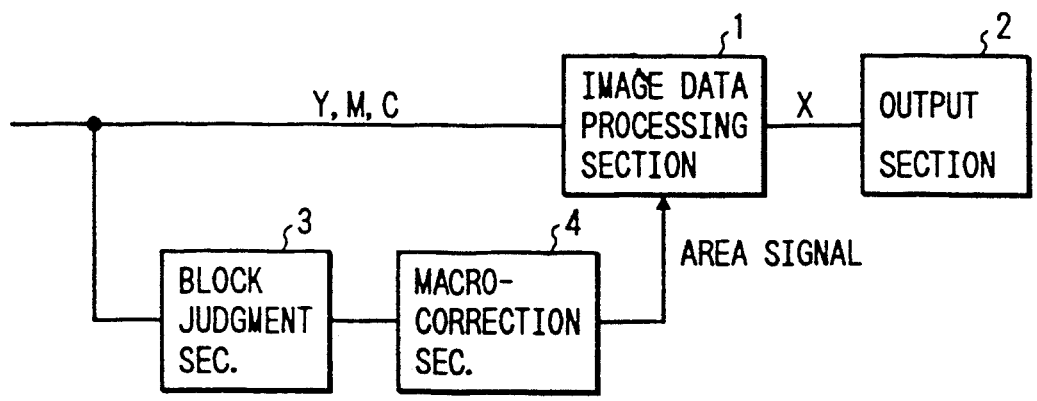
FIG. 1 is a block diagram showing an image processor according to an embodiment of the present invention.

FIG. 1 is a diagram for a description of an image processor capable of identifying graphic areas and character areas, which is an embodiment of the invention.

Figure 12:
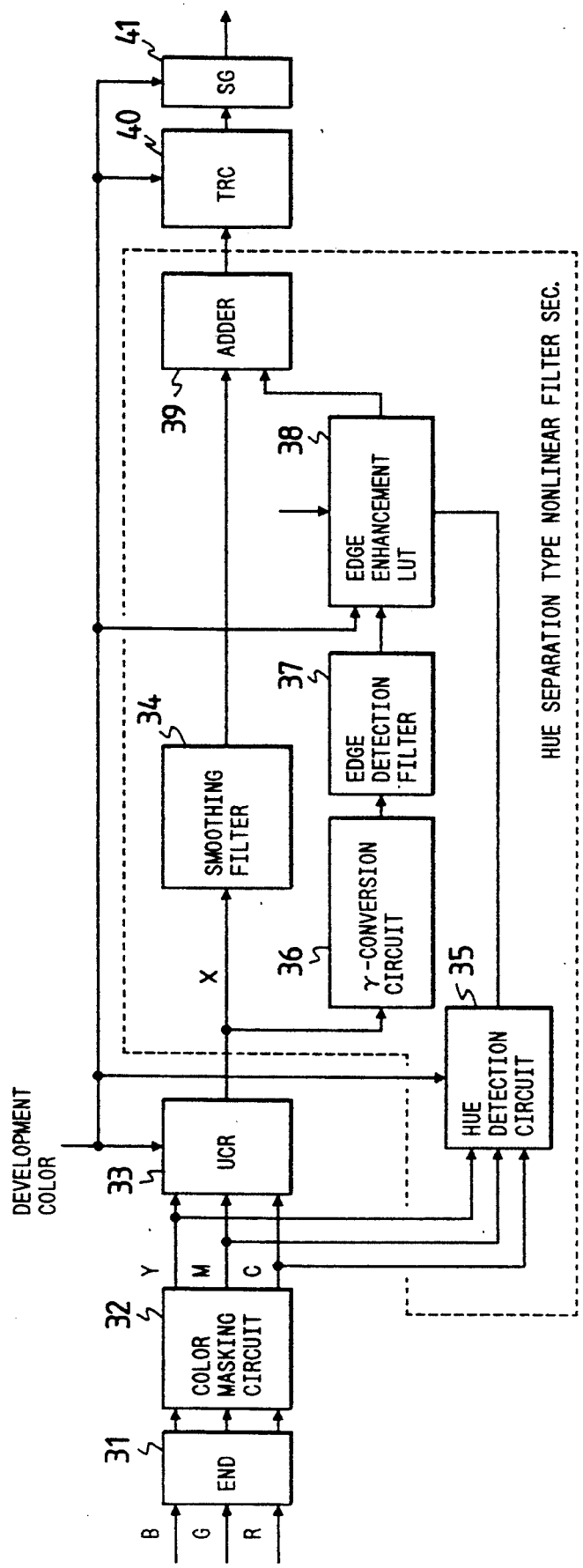
FIG. 12 is a block diagram showing the configuration of a digital color image processor.
Figure 13:
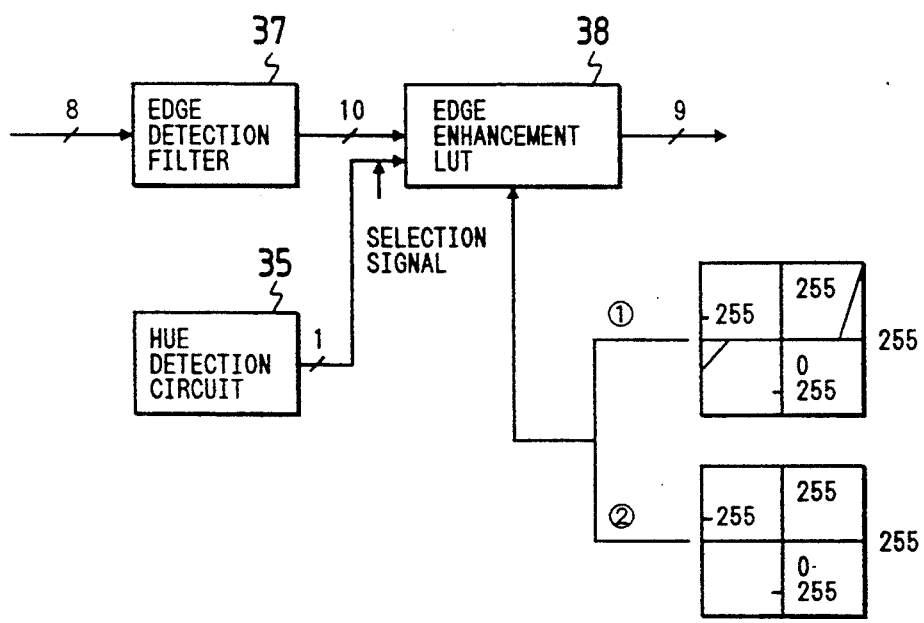
FIG. 13 is a block diagram showing an exemplary configuration of a conventional edge processing circuit.
Figures 14A, 14B, 14C:
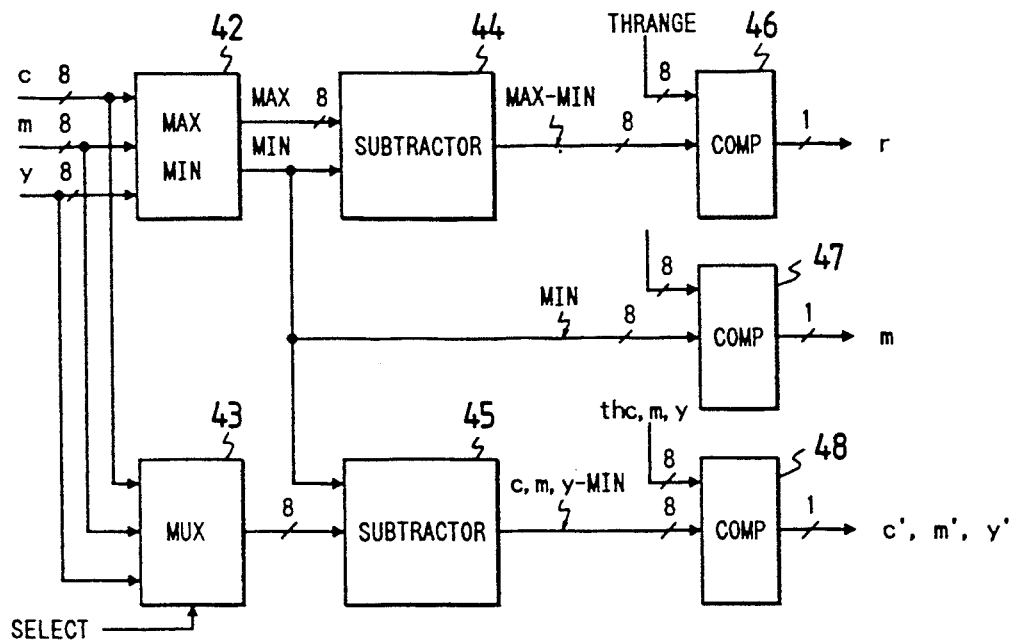
FIGS. 14(a) to 14(c) are diagrams showing the configuration of a hue detection circuit.

In FIG. 1, an image data processing section 1 has, e.g., such a structure as shown in FIG. 12, and performs various processes on image data. An output section 2 reproduces a full-color image by superposing dot images of respective colors. A block judgment section 3 judges the type of a block in question (block-by-block basis) which consists of a plurality of pixels, i.e., judges whether it is a white block, a character block or a graphic block on a block basis by calculating the maximum and minimum of Y, M and C components of each pixel and by comparing the maximum and minimum with a threshold. The block judgment section 3 may be constructed so as to further obtain a judgment value specifying whether the character block contains a color character or a black character based on the level judgment using the maximum and the minimum. A macro-correction section 4 corrects the judgment value of a subject block based on judgment values of the blocks surrounding the subject block, which are picked-up by masking the surrounding blocks with a mask pattern. That is, if the subject block has a judgment value of character, it is judged from the judgment values of the surrounding blocks whether the subject block should be corrected to a graphic block, and if the subject block has a graphic judgment value, it is judged from the judgment values of the surrounding blocks whether the subject block should be corrected to a character block. If it is judged that a correction should be made, then a judgment value is converted to a correct one. Given a judgment on a block-by-block basis whether the subject block is a character block or a graphic block and further using a judgment value specified by such judgment as an area signal, the image data processing section 1 can perform the control operation so that only the color K is selected for a black character and only a toner color or colors corresponding to the color (Y, M, C, R, G or B) can be selected for a color character. As a result, character reproduction performance of both black and color characters can be improved, and a smooth graphic image with no edge enhancement can be reproduced. For the color judgment on color characters, the hue detection circuit 35 described above may be employed.

The block judgment section 3 and the macro-correction section 4 will be described below.

Figure 2:
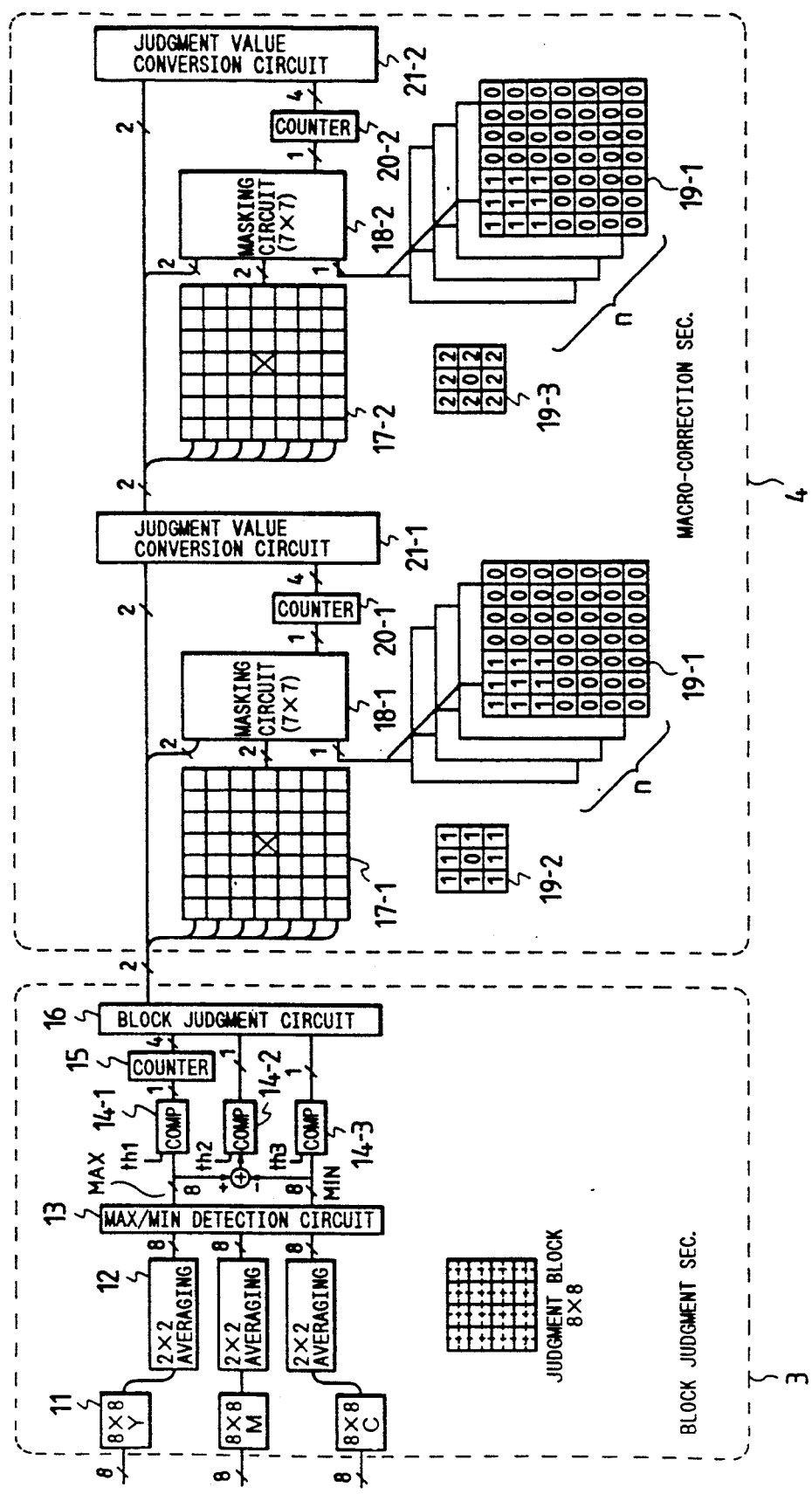
FIG. 2 is a diagram showing an exemplary configuration of a circuit for identifying a black character area and a color/graphic area.

FIG. 2 shows an exemplary configuration of a circuit for identifying a black character area and a color/graphic area.

In FIG. 2, a buffer 11 receives image data of Y, M and C with a unit of 8×8 pixels as a subject block to be judged. A 2×2 averaging circuit 12 calculates the average of the image data of 2×2 pixels (sub-block) in the subject block, which have been taken into the buffer 11. A maximum/minimum value detection circuit 13 detects the maximum MAX and the minimum MIN of the Y, M and C image data averaged for the 2×2 pixels. A comparator 14-1 detects 2×2 pixels whose maximum MAX is smaller than a threshold th1. A lower threshold th1 allows a white pixel to be detected. A counter 15 counts the number of 2×2 pixels detected as a white pixel. A comparator 14-2 detects 2×2 pixels in which a difference between the maximum MAX and the minimum MIN is smaller than a threshold th2. If the difference between the maximum MAX and the minimum MIN is small, the sub-block of the 2×2 pixels can be judged to be grey since Y, M and C of the same quantity are converted into K as described before. A comparator 14-3 detects 2×2 pixels whose minimum MIN is larger than a threshold th3, i.e., 2×2 pixels of high density. As is clear from the functions of the comparators 14-2, 14-3, when a sub-block of 2×2 pixels unit is found to be grey and highly dense, such 2×2 pixels can be judged to be black. A block judgment circuit 16 judges whether the subject block is a white block, a black block or a graphic block from the outputs of the counter 15 and comparators 14-2, 14-3, and outputs a judgment result as two-bit information. A total of 16 judgment values are produced for the subject block by the above judgment performed every 2×2 pixel unit. If a count indicated by the counter 15 is 16, the subject block is judged to be a white block, otherwise it will be further judged whether the subject block is a black character block or a graphic block. The judgment condition for the black character block is that the black pixel count obtained from the outputs of the comparators 14-2, 14-3 and the value indicated by the counter 15 are equal to or greater than predetermined thresholds, since a black characters is present in a white background.

Upon judgment whether the subject block consisting of 8×8 pixels is a white block, a black block or a graphic block by the thus constructed block judgment section 3, the macro-correction will be performed.

In the macro-correction section 4, a judgment value buffer 17-1, a masking circuit 18-1, mask patterns 19-1, 19-2, a counter 20-1, and a judgment value conversion circuit 21-1 serve to convert the character block judgment value "2" of the subject block into the graphic block judgment value "1". A judgment value buffer 17-2, a masking circuit 18-2, mask patterns 19-1, 19-3, a counter 20-2, and a judgment value conversion circuit 21-2 disposed at the second stage serve to convert the graphic block judgment value "1" of the subject block into the character block judgment value "2".

The macro-correction will further be described in detail. FIGS. 3(a) to 3(f) are charts for a description of mask patterns to be used for the macro-correction; and FIGS. 4(a) to 4(e) are charts for a description of the macro-correction by which to remove an isolated block and to fill in a block.

Assuming that the judgment value of a block having a small difference in density is L, the judgment value of a block having a large difference in density is H, and the judgment value of a white block is 0, both a black character area and a graphic area consist of L's and H's. However, there exists a difference between their constructional patterns. That is, a black character area has, around an H block, no group of L's which is greater than a predetermined size but has H's of more than a predetermined number, while a graphic area has, around an L block, a group of L's which is greater than a predetermined size and has L's of more than a predetermined number.

To judge the existence of a group of blocks having a specific feature, the patterns 19-1 as shown in FIGS. 3(a) to 3(d) are prepared so as to mask each of the four kinds of 3×3 blocks adjacent to the subject block diagonally. First, the judgment values of the 7×7 blocks surrounding the subject block are stored in the judgment value buffer 17-1; then, the masking circuit 18-1 detects the judgment value "1" for a graphic block by masking the 3×3 blocks which are indicated as "1" in each of FIGS. 3(a) to 3(d), and the counter 20-1 counts the number of graphic blocks. Further, to see the distribution of the judgment values of the 8 blocks directly adjacent to the subject block vertically, horizontally or diagonally, the mask patterns 19-2, 19-3 as shown in FIGS. 3(e) and 3(f), respectively are prepared.

First, a process will be described in which the macro-correction section 4 converts the judgment value of the subject block from "2" (character block) to "1" (graphic block). If any of the count of the counter 20-1 for the 3×3 blocks is 9 (=3×3) when counting the judgment value "1" (graphic block) by masking every 3×3 blocks with the mask patterns 19-1 (FIGS. 3(a) to 3(d)), or if the count is greater than or equal to a predetermined value, e.g., 7 when counting the judgment value "1" by masking the 8 blocks adjoining the subject block vertically, horizontally or diagonally with the mask pattern shown in FIG. 3(e), then the judgment conversion circuit 21-1 judges that the subject block is a graphic block and converts its judgment value from "2" (character block) to "1" (graphic block). This process is shown in FIGS. 4(a) to 4(d). The blackened block is the subject block having the judgment value "2" for the black character block, and the meshed blocks are a group of blocks, each having the judgment value "1" for the graphic block. The white blocks may represent any type of block in this case. Accordingly, a correction process of removing an isolated block is performed.

Figure 4A:
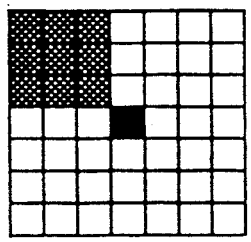
FIGS. 4(*a*) to 4(*3*) are charts for a description of the macro-correction by which to remove an isolated block and to fill in a block.
Figure 4B:
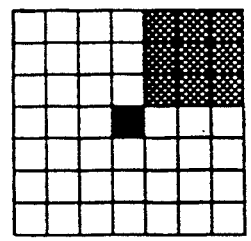
Figure 4C:
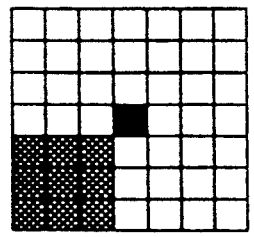
Figure 4D:
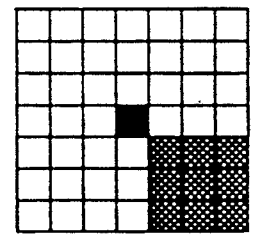
Figure 4E:
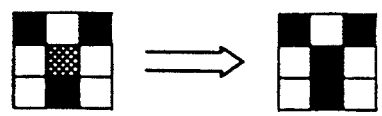

On the other hand, the judgment value conversion from "1" (graphic block) to "2" (character block) requires the following process. If no count of the counter 20-2 for the 3 ×3 blocks is 9 when counting the judgment value "1" (graphic block) by masking the 3×3 blocks with the mask patterns 19-1 (FIGS. 3(a) to (d)), and if the count value is greater than or equal to a predetermined value, e.g., 3 when counting the judgment value "2" (character block) by masking the 8 blocks adjoining the subject block vertically, horizontally or diagonally with the mask pattern 19-3 (FIG. 3(f)), then the judgment conversion circuit 21-2 judges that the subject block is a character block and converts its judgment value from "2" (graphic block) to "1" (character block). Shown in FIG. 4(e) is an example in which the three blocks among the 8 adjoining blocks are character blocks. Accordingly, a correction process of filling in a block is performed.

Figure 8A:
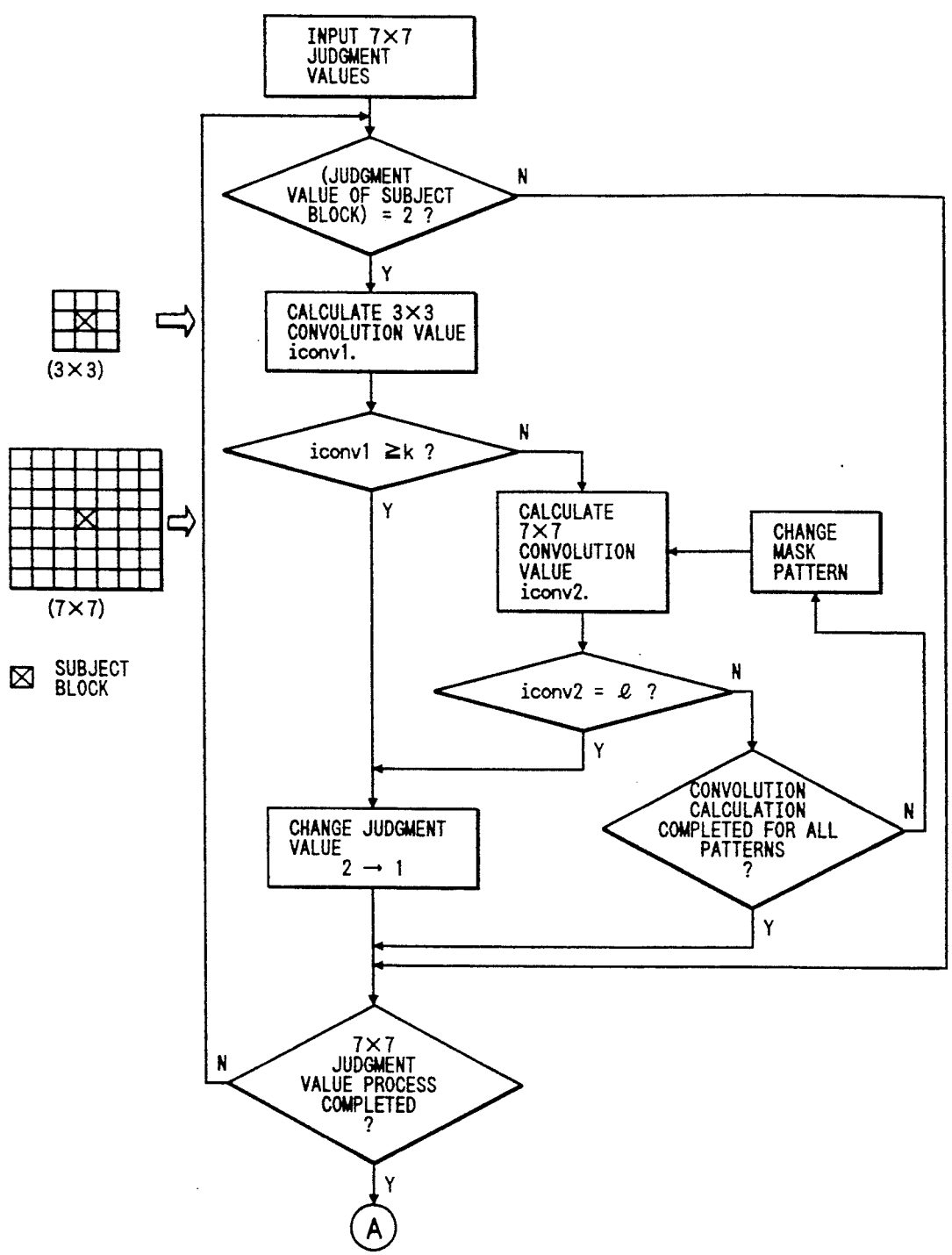

FIGS. 8(a) and 8(b) are flow charts showing an algorithm corresponding to the above two processes.

Now, algorithms for identifying the type of block will be described.

Figure 5:
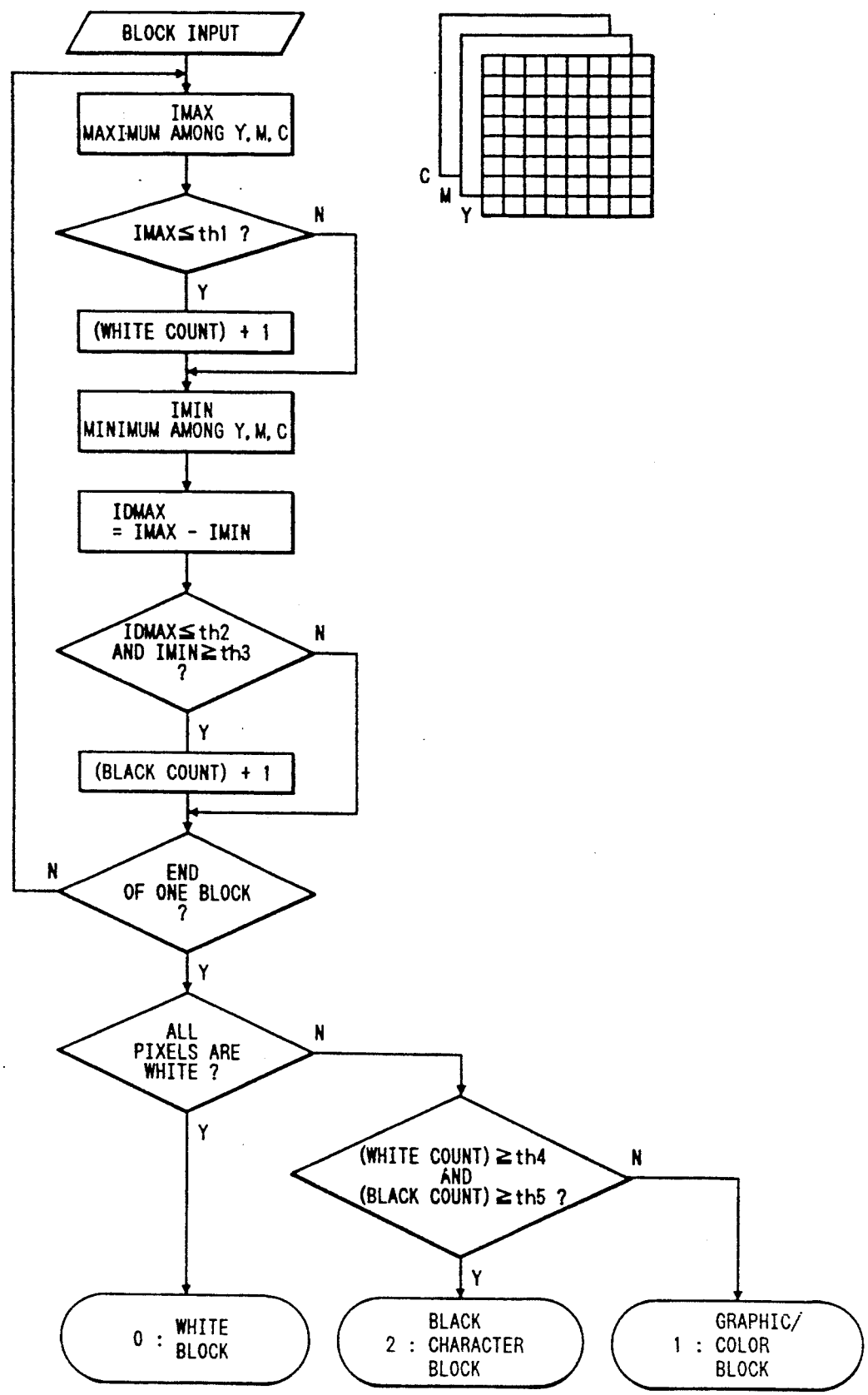
FIGS. 5 to 7 are flow charts for a description of algorithms for identifying a black character block.
Figure 6:
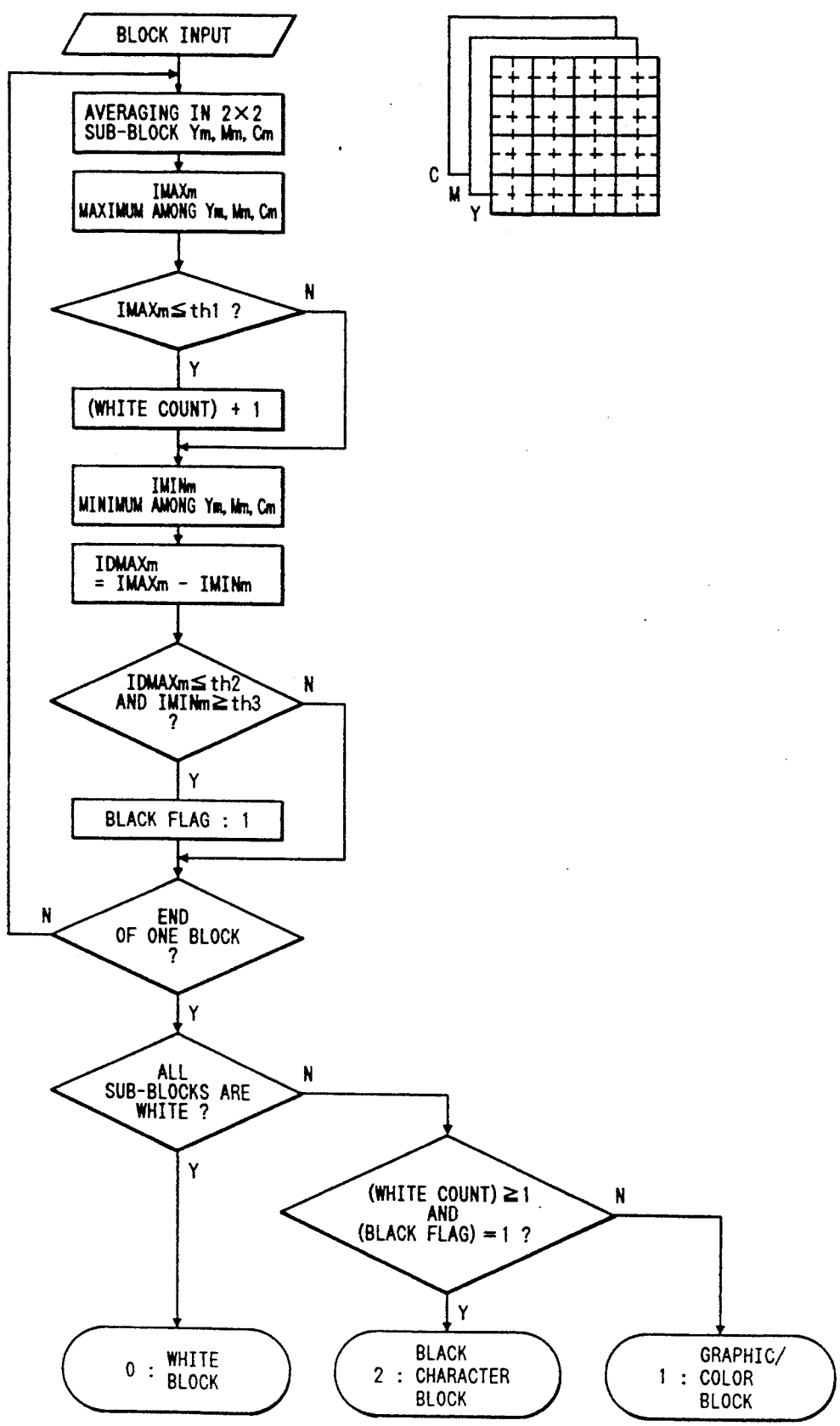
Figure 7:
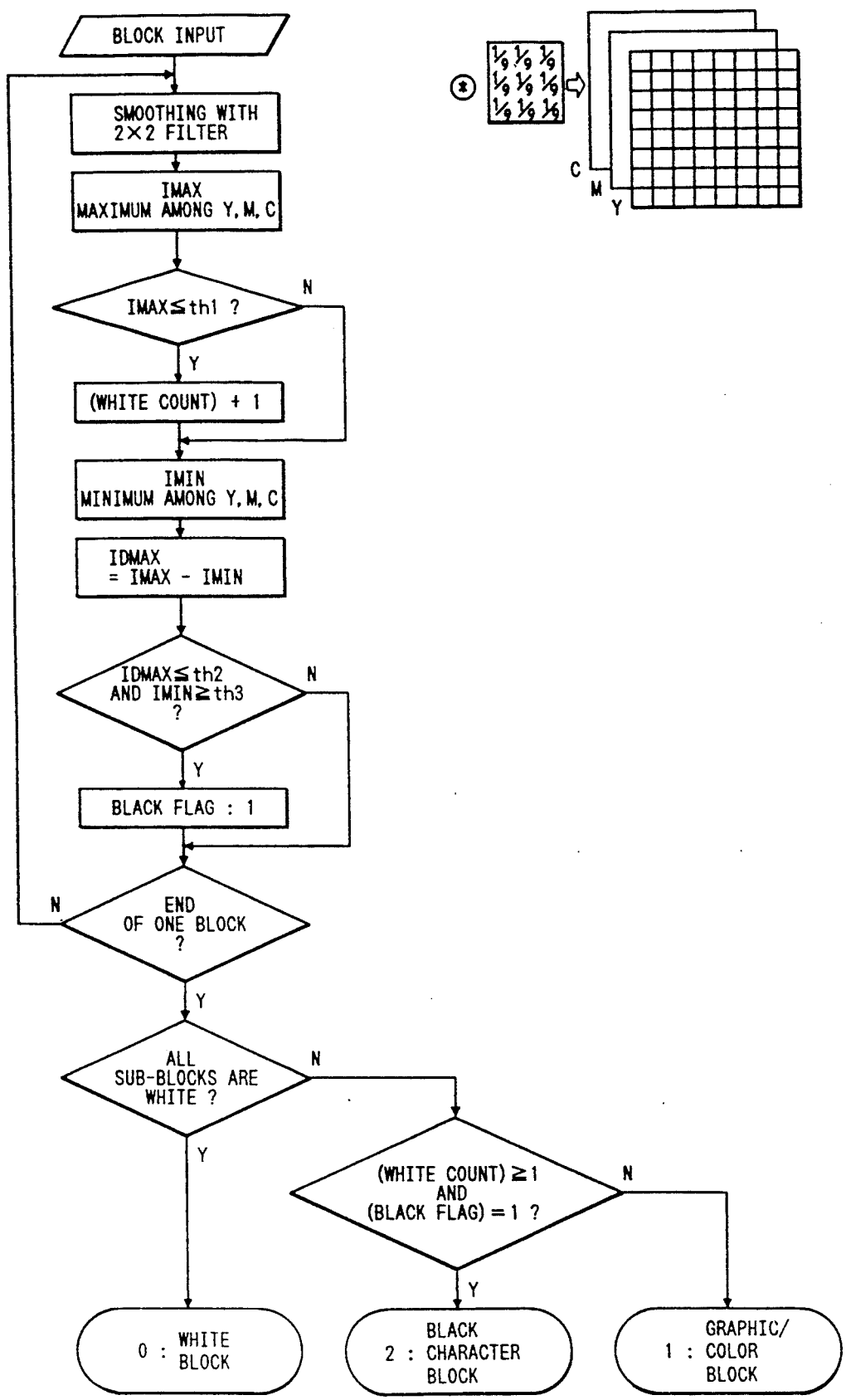

FIGS. 5 to 7 are flow charts for a description of algorithms for identifying a black character block.

Shown in FIG. 5 is an example in which each pixel in a block is counted as a white pixel if the maximum of Y, M C is smaller than or equal to a threshold th1; and as a black pixel if a difference between the maximum and minimum is smaller than or equal to a threshold th2 and the minimum is greater than or equal to a threshold th3. If all the pixels are white, a judgment value "0" for the white block is given. If the white pixel count is greater than or equal to a threshold th4 and the black pixel count is greater than or equal to a threshold th5, then a judgment value "2" for the black character block is given. Otherwise, the judgment value "1" for the graphic/color block is given. To sum up, the block judgment is performed based on the frequency of the full white pixels and the full black pixels in the block.

Shown in FIG. 6 is an example in which the block judgment is carried out on a 2×2 sub-block basis. That is, a subject block is divided into 2×2 sub-blocks, and the average of image data of pixels in each sub-block is obtained. Then, the maximum and minimum are similarly calculated, compared with thresholds to detect white sub-blocks and black sub-blocks, and the final judgment, whether the subject block is a character block or a graphic block, is performed by the presence/absence of the full white sub-blocks and the full black sub-blocks.

Shown in FIG. 7 is an example in which a subject block is subjected to a smoothing process on a 3×3 sub-block basis, and thereafter a judgment process similar to the above is conducted.

Figures 9A, 9B, 9C, 9D, 9E, 9F, 9G, 9H, 9I:
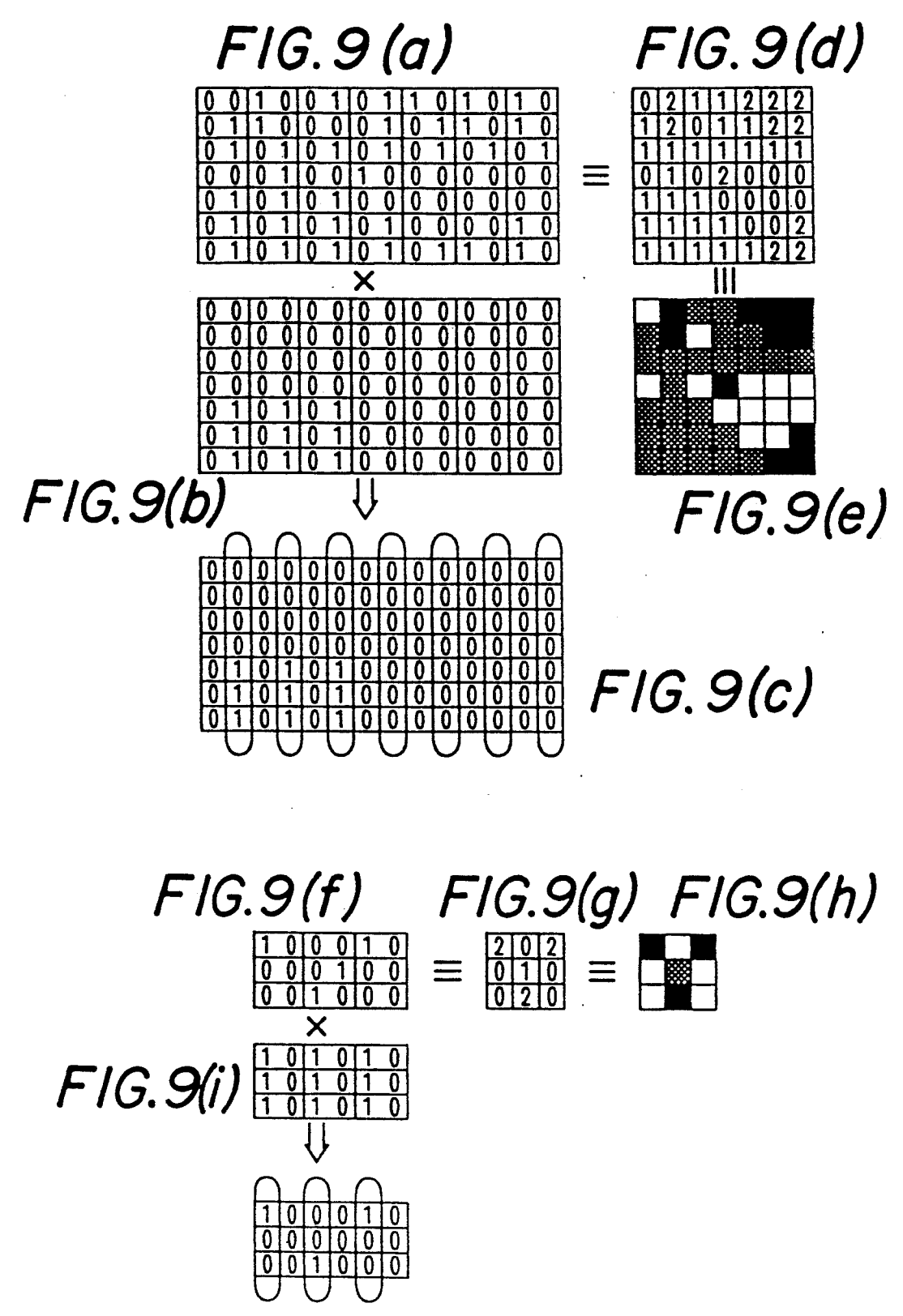

FIG. 9 includes charts (a) to (h) for a description of the logical operation performed in the macro-correction. When the 7×7 blocks which surround the subject block having the judgment value "2" have the judgment values as shown in FIG. 9(d), the judgment value of each block becomes as shown in FIG. 9(a) in 2-bit representation, and becomes as shown in FIG. 9(e) if expressed by blackening for a black character block and by meshing for a graphic block. Now, if the number of lower bits having the value "1" is counted by masking the lower left group of 3×3 blocks with the mask pattern shown in FIG. 9(b), the number of graphic blocks can be detected on a 3×3 block group basis. Further, if the number of higher bits having the value "1" is counted by masking the 3×3 blocks surrounding the subject block shown in each of FIGS. 9(f) to 9(h) with the mask pattern shown in FIG. 9(i), the number of black character blocks in the surrounding blocks can be detected.

Figure 10:
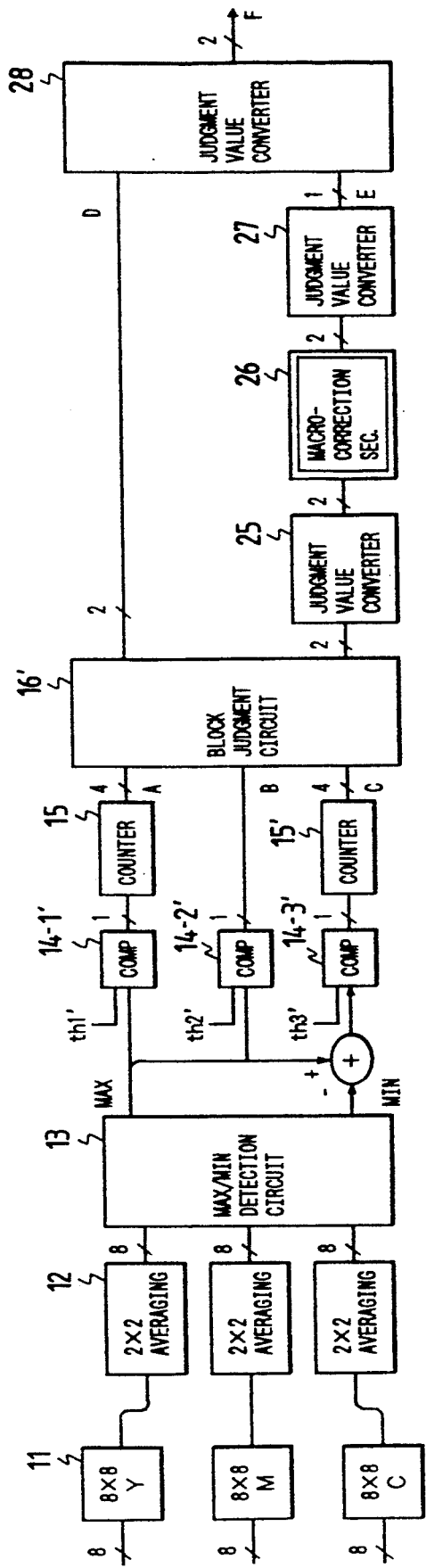
FIG. 10 is a block diagram showing an image processor according to another embodiment of the invention, which can identify a black character, a color character and a graphic image.
Figure 11:
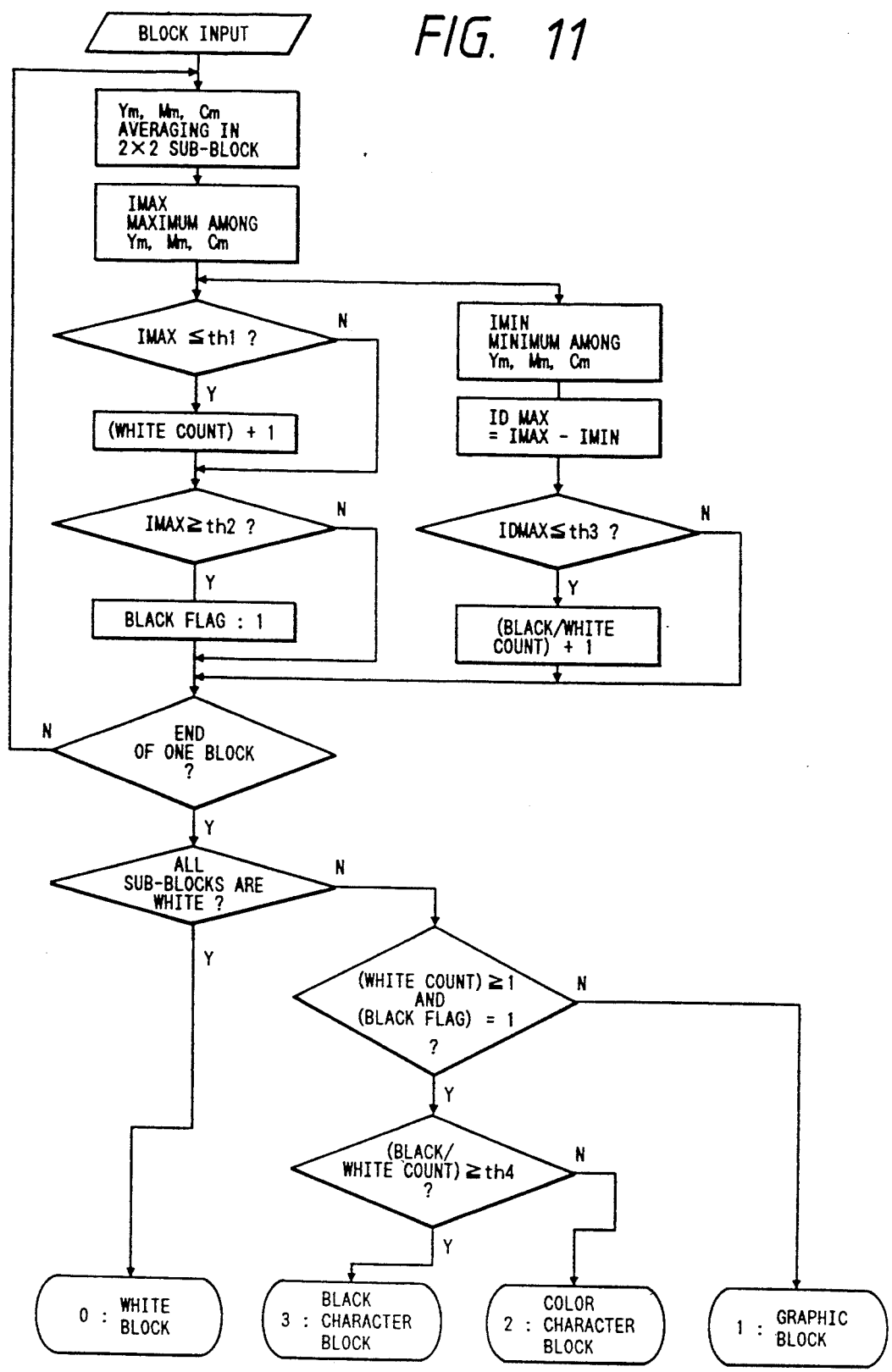
FIG. 11 is a flow chart for a description of an algorithm performing the process of FIG. 10.

FIG. 10 is a block diagram showing another embodiment of the invention for identifying a black character, a color character, and a graphic image; and FIG. 11 is a flow chart for a description of its algorithm.

In FIG. 10, a comparator 14-2' detects a sub-block of 2×2 pixels whose maximum is greater than a threshold th2' for the character block judgment, while a comparator 14-3' detects a sub-block of 2×2 pixels in which a difference between the maximum and minimum is smaller than a threshold th3'. A block judgment unit 16' judges that the subject block is a white block (judgment value "0") when the count indicated by a white sub-block counter 15 equals to the total number of sub-blocks. Otherwise, when there exists a sub-block detected by the comparator 14-2' (flag on), and the count indicated by a counter 15' is greater than a predetermined value, the subject block is judged as a black character block (judgment value "3"). When there exists a sub-block detected by the comparator 14-2', and the count indicated by the counter 15' is less than a predetermined value, the subject block is judged as a color character block (judgment value "2"). Further, in the remaining case, the subject block is judged as a graphic block (judgment value "1").

A judgment value converter 25 serves to prepare such a condition that the previously described macro-correction can be performed on the judgment value. That is, the converter 25 groups the judgment values for both of the color character and black character into "2" to eliminate the distinction therebetween. A judgment value converter 27 groups both of the judgment values "0" for the white block and "1" for the graphic block, which are output from the macro-correction section 26, into "0", and converts the judgment value "2" for the character block to "1". Therefore, a judgment value converter 28 performs a logical operation using the judgment values "1" to "3" from the block judgment unit 16' and the values "0" and "1" from the judgment value converter 27 to obtain the judgment values "0" for the white and graphic blocks, "1" for the color character block, and "2" for the black character block.

FIG. 11 is a flow chart showing an algorithm corresponding to the block judgment part of the above process. The algorithm of FIG. 11 is constructed so that the 3 judgment values, "0" for the white block, "3" for the black character block, "2" for the color character block, and "1" for the graphic block, can be obtained on the basis of the number of sub-blocks (white count) whose maximum is smaller than the threshold th1, the number of sub-blocks (black/white count) in which the difference between the maximum and minimum is smaller than the threshold th3, and the presence/absence (black flag) of sub-block whose maximum is greater than the threshold th3.

As is apparent from the foregoing description, according to the invention, blocks are classified into the three types based on the density distribution, and the pattern matching process is carried out considering the characteristic patterns inherent to the character area and the graphic area. Therefore, identification of character areas over a wide area is possible with high accuracy and with a relatively simple process. Although in the identification process based only on the difference between the maximum and minimum, a dot may be mistaken for a character, the accuracy of identification can be improved by checking the frequency of the black and white pixels or by checking the difference in density after averaging image data over a plurality of pixels such as 2×2 pixels.

What is claimed is:

1. A color image processor comprising:
means for dividing image data of a document into a plurality of blocks each including a plurality of pixels;
block judgment means for producing a judgment value of a subject block including subject pixels on the basis of a frequency of while pixels among the subject pixels and a density distribution of the subject pixels, the judgment value representing whether the subject block is a white block, a character block or a graphic block;
macro-correction means for performing a macro-correction on the judgment value of the subject block by pattern matching between judgment values of blocks surrounding the subject block, as produced by said block judgment means, and the judgment value of the subject block to produce a macro-corrected judgment value, said macro-correction means judging whether a macro-corrected judgment value correction of the subject block between a character block and a graphic block should be performed or not on the basis of a distribution pattern of character blocks and graphic blocks in the blocks surrounding the subject block and a judgment whether there exists a graphic area larger than a predetermined size in the distribution pattern; and
image data processing means for selecting, in accordance with the macro-corrected judgment value, image data of a development color or colors required for reproducing the subject block.

2. A color image processor comprising:
means for dividing image data of a document into a plurality of blocks each including a plurality of pixels;
block judgment means for producing a judgment value of a subject block including subject pixels on the basis of a frequency of white pixels among the subject pixels and a density distribution of the grey pixels among the subject pixels, the judgment value representing whether the subject block is a white block, a black character block or a graphic/color block;
macro-correction means for performing a macro-correction on the judgment value of the subject block by pattern matching between judgment values of blocks surrounding the subject block, as produced by said block judgment means, and the judgment value of the subject block to produce a macro-corrected judgment value, said macro-correction means judging whether a macro-corrected judgment value correction of the subject block between a character block and a graphic block should be performed or not on the basis of a distribution pattern of character blocks and graphic blocks in the blocks surrounding the subject block and a judgment whether there exists a graphic area larger than a predetermined size in the distribution pattern; and
image data processing means for selecting in accordance with the macro-corrected judgment value, image data of a development color or colors required for reproducing the subject block.

3. A color image processor comprising:
means for dividing image data of a document into a plurality of blocks each including a plurality of pixels;
block judgment means for producing a judgment value of a subject block including subject pixels on the basis of a frequency of while pixels among the subject pixels, a frequency of gray pixels among the subject pixels, and a density distribution of the subject pixels, the judgment value representing whether the subject block is a white block, a black character block, a color character block or a graphic block;

macro-correction means for performing a macro-correction on the judgment value of the subject block by pattern matching between judgment values of blocks surrounding the subject block, as produced by said block judgment means, and the judgment value of the subject block to produce a macro-corrected judgment value, said macro-correction means judging whether a macro-corrected judgment value correction of the subject block between a character block and a graphic block should be performed or not on the basis of a distribution pattern of character blocks and graphic blocks in the blocks surrounding the subject block and a judgment whether there exists a graphic area larger than a predetermined size in the distribution pattern; and image data processing means for selecting, in accordance with the macro-corrected judgment value, image data of a development color or colors required for reproducing the subject block.

* * * * *

UNITED STATES PATENT AND TRADEMARK OFFICE
CERTIFICATE OF CORRECTION

PATENT NO. : 5,331,442
DATED : July 19, 1994
INVENTOR(S) : Yoshiyuki Sorimachi

It is certified that error appears in the above-indentified patent and that said Letters Patent is hereby corrected as shown below:

Claim 1, Column 9, Line 68 change "while" to --white--.

Claim 3, Column 10, Line 64 change "while" to --white--.

Signed and Sealed this

Twenty-eight Day of March, 1995

Attest:

BRUCE LEHMAN

Attesting Officer

Commissioner of Patents and Trademarks